US012783576B2

(12) United States Patent
Su et al.

(10) Patent No.: US 12,783,576 B2

(45) Date of Patent: Nov. 3, 2026

(54) UPDATING AND SEARCHING A REPOSITORY HAVING AUDIO FILES INCLUDING PRONUNCIATIONS OF NAMES OF USERS IN COMPUTER RENDERED CONTENT

(71) Applicant: INTERNATIONAL BUSINESS MACHINES CORPORATION, Armonk, NY (US)

(72) Inventors: Jun Su, Beijing (CN); Su Liu, Austin, TX (US); Roger Martin Weaver, Austin, TX (US); Yang Liang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 18/156,272

(22) Filed: Jan. 18, 2023

(65) Prior Publication Data

US 2024/0241904 A1 Jul. 18, 2024

(51) Int. Cl.
*G06F 16/632* (2019.01)
*G06F 3/16* (2006.01)
(Continued)

(52) U.S. Cl.
CPC ............ *G06F 16/634* (2019.01); *G06F 3/165* (2013.01); *G06F 3/167* (2013.01); *G06F 16/61* (2019.01);
(Continued)

(58) Field of Classification Search
CPC ...... G06F 16/634; G06F 16/61; G06F 16/686; G06F 3/165; G06F 3/167; G06F 40/263; G06F 40/40
See application file for complete search history.

(56) References Cited

U.S. PATENT DOCUMENTS 8,719,027 B2 * 5/2014 Chen ........................ G10L 13/08 704/260
9,721,563 B2 8/2017 Naik
(Continued)

OTHER PUBLICATIONS

K. Bartkova, "Generating Proper Name Pronunciation Variants for Automatic Speech Recognition", 2003, [online], https://www.internationalphoneticassociation.org/icphs-proceedings/ICPhS2003/papers/p15_1321.pdf.
(Continued)

*Primary Examiner* — Huawen A Peng

(74) *Attorney, Agent, or Firm* — CHIP LAW GROUP

(57) ABSTRACT

Providing a computer program product, system, and method for updating and searching a repository having audio files including pronunciations of names of users in computer rendered content. A repository includes user name pronunciation information. User name pronunciation information for a user indicates a language, a pronunciation attribute to pronounce name text of the user, and an audio file providing pronunciation of the name text in the language according to the pronunciation attribute. A name pronunciation request is received indicating an audience language and an audience pronunciation attribute in which name text of a user is to be pronounced. A determination is made, from the repository, of an audio file associated with a language and pronunciation attribute for the user matching the audience language and the audience pronunciation attribute, respectively. The determined audio file is returned to output audio in the audio file pronouncing the name text of the user.

20 Claims, 7 Drawing Sheets

(51) Int. Cl.
*G06F 16/61* (2019.01)
*G06F 16/68* (2019.01)
*G06F 40/263* (2020.01)
*G06F 40/40* (2020.01)

(52) U.S. Cl.
CPC .......... *G06F 16/686* (2019.01); *G06F 40/263* (2020.01); *G06F 40/40* (2020.01)

(56) References Cited

U.S. PATENT DOCUMENTS

| | | | | |
|---|---|---|---|---|
| 10,152,965 | B2 | 12/2018 | Bruguier et al. | |
| 11,069,336 | B2 | 7/2021 | Naik | |
| 11,810,471 | B2 * | 11/2023 | Karas | G09B 19/04 |
| 2015/0006185 | A1 | 1/2015 | Redfern et al. | |
| 2020/0357390 | A1 * | 11/2020 | Bromand | G10L 13/00 |
| 2022/0005458 | A1 | 1/2022 | Beaufays et al. | |
| 2022/0012420 | A1 | 1/2022 | Henderson et al. | |
| 2023/0138820 | A1 * | 5/2023 | Bohra | G10L 13/08 704/258 |

OTHER PUBLICATIONS

A. Bruguier, et al., “Learning Personalized Pronunciations for Contact Name Recognition”, Google, Inc., 5pp., [onlne] https://static.googleusercontent.com/media/research.google.com/en//pubs/archive/45415.pdf.

“7 Websites to Pronounce Names Correctly Online with Audio”, Sysprobs, Mar. 11, 2022, 17pp., [online][retrieved 01/07/023]https://www.sysprobs.com/pronounce-names-correctly-online.

“How to pronounce Jose”, HowToPronounce, 6pp., [online][retrieved 01/07/023] https:www,howtopronounce.com/Jose.

“IBM Watson Text to Speech”, IBM Corporation, 7pp., [online][retrieved 01/07/023] https://www.ibm.com/cloud/watson-text-to-speech?p1=Search&p.

“LinkedIn will let you record the correct pronunciation of your name”, LinkedIn, Jul. 8, 2020, 4pp., [online][retrieved 01/07/023] https://www.engadget.com/linkedin-record-name-pronunciation-142.

“List of Varieties of Chinese”, Wikipedia, 16pp., [online][retrieved 01/18/023] https://en.wikipedia.org/wiki/List_of_varieties_of_Chinese.

J. Peltason, “Modelng Human-Robot-Interaction Based on Generic Interaction Patterns”, Mar. 13, 2012, 212 pp.

P. Khanna, “You can now remind people how to pronounce your name on Linkedin”, 2pp., [online][retrieved 01/18/023] https://pocketnow.com/you-can-now-remind-people-how-to-pronounce . . . .

No Author “Chatbot Market by Product (Artificial Intelligence, Marketing); By Application (Bots for Service, Bots for Social Media); By End User (Small Enterprises, Medium Enterprises)—Growth, Share, Opportunities & Competitive Analysis, 2024-2032”, Feb. 13, 2026, 13 pages, https://www.credenceresearch.com/report/chatbots-market.

No Author “How to pronounce Jaime?”, Feb. 13, 2026, 07 pages, https://www.howtopronounce.com/jaime.

No Author “Social Media Advertising—Worldwide”, Feb. 13, 2026, 13 pages, https://www.statista.com/outlook/amo/advertising/social-media-advertising/worldwide?currency=USD#ad-spending.

* cited by examiner

UPDATING AND SEARCHING A REPOSITORY HAVING AUDIO FILES INCLUDING PRONUNCIATIONS OF NAMES OF USERS IN COMPUTER RENDERED CONTENT

BACKGROUND OF THE INVENTION

1. Field of the Invention

The present invention relates to a computer program product, system, and method for updating and searching a repository having audio files including pronunciations of names of users in computer rendered content.

2. Description of the Related Art

Participants of social and work network sites may observe names of other participants and may want to know how to pronounce the names for when they later directly communicate with the named person. Currently, some web sites will provide human pronunciation features which allow users to record a pronunciation of their names so other users can easily play that pronunciation. This is preferable to the pronunciations provided by speech synthesizers that generate pronunciations based on phonemes, which may not produce the pronunciation the named person considers as correct. For instance, the same name may be pronounced differently in different languages and in different locales, such as the case with different dialects. However, in many social networks the pronunciation feature is not widely deployed. For instance, currently the business social network LinkedIn® has more than 690,000,000 active users, but only approximately 1~2% of users have uploaded their name pronunciations into their profile. (LinkedIn is a registered trademark of LinkedIn Corporation and its affiliates in the United States and/or other countries).

There is a need in the art for improved techniques to gather and provide name pronunciations for name text of users appearing in computer rendered content to inform an audience of the computer rendered content of the correct pronunciations of the name text.

SUMMARY

Providing a computer program product, system, and method for updating and searching a repository having audio files including pronunciations of names of users in computer rendered content. A repository includes user name pronunciation information for users. User name pronunciation information for a user indicates a language, a pronunciation attribute to pronounce name text of the user, and an audio file providing an audio pronunciation of the name text in the language according to the pronunciation attribute. A name pronunciation request is received indicating an audience language and an audience pronunciation attribute in which name text of a user is to be pronounced. A determination is made, from the repository, of an audio file associated with a language and pronunciation attribute for the user matching the audience language and the audience pronunciation attribute, respectively. The determined audio file is returned to output audio in the audio file pronouncing the name text of the user.

DETAILED DESCRIPTION

Even though certain social network sites may provide features to allow users to add pronunciations of their names to their profile, in most cases users do not take advantage of this feature. Further, a user may have different pronunciations of their name in different contexts. For instance, a person with a non-English name may pronounce their name in English in different accents depending on the context or locale in which name text of the name is rendered.

Described embodiments provide improved computer technology to gather audio files of name pronunciations of name text of users in different contexts, such as in different languages and pronunciation attributes of the pronunciation, such as dialect and accent used. These audio files gathered for a user providing different pronunciations for different contexts may be automatically gathered when the name text appears in different online content and stored in the repository for the user associated with the rendered name text. This allows for automatic and systematic gathering of audio files having pronunciations of name text for users appearing in rendered content.

Described embodiments further provide improvements to computer technology for providing name pronunciations to the audience of the computer rendered content having the name text. Upon receiving audience selection to render audio of the pronunciation for name text in computer rendered content, described embodiments generate a name pronunciation request of the selected name text and locale context in which the name text is presented, e.g., language and pronunciation attribute. This name pronunciation request is sent to the name pronunciation repository to retrieve an audio file having the specific pronunciation of the name text in the determined context in which the name text is presented. In this way, described embodiments ensure that there is a robust repository of name pronunciations in different contexts that may be accessed and searched to return a specific pronunciation for name text of a user specific to the context in which the name text is presented in the computer rendered content.

Figure 1:
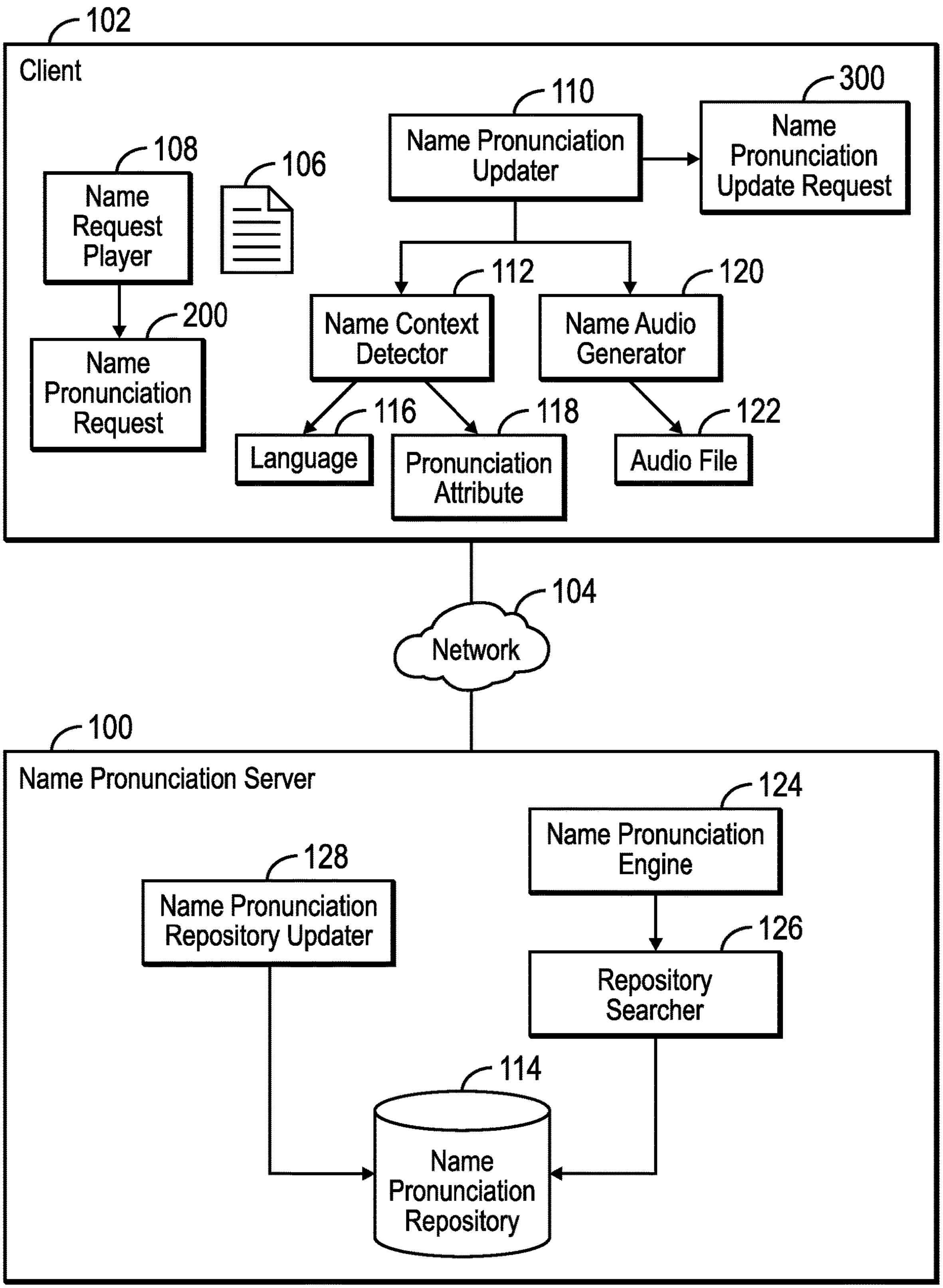
FIG. 1 illustrates an embodiment of a computing environment to provide name pronunciations for name text of users appearing in computer rendered content.

FIG. 1 illustrates an embodiment of a name pronunciation server 100 in communication with a client system 102 over a network 104. The client 102 renders computer rendered content 106, such as a Hypertext Markup Language (HTML) page, that includes name text of a user identified in the repository 114, i.e., a user registered to have name pronunciations maintained for name text of the user in the repository 114. A name request player 108 at the client 102 may receive a request from the observer of the computer rendered content 106 to play digital audio pronouncing the name text observed in the content 106 so the observer will know how to properly pronounce the name text. The name request player 108 may generate a name pronunciation request 200, such as an Application Programming Interface (API), to send to the name pronunciation server 100 to retrieve an audio file having a pronunciation of the name text to play at the client 102.

The client 102 may further include a name pronunciation updater 110 program to generate audio files for name text instances to add to a name pronunciation repository 114 managed by the pronunciation server 100. The name pronunciation updater 110 may invoke a name context detector 112 to process computer rendered content 106 in which the name text is presented, such as by using natural language processing (NLP), to determine a language 116 and pronunciation attribute 118 of name text for a user. The language 116 and pronunciation attribute 118 may further be determined from user account information for the user associated with the computer rendered content 106. The pronunciation attribute 118 may indicate a dialect or accent that affects how the name text is pronounced in the indicated language 116. For instance, the language 116 may indicate English and the pronunciation attribute 118 may indicate to pronounce the name in English with a specific Chinese accent if the user is a Chinese English speaker, such as a Beijing accent or other dialect, where a dialect may be a particular form of a language which is peculiar to a specific region or social group. Further, the different dialects may be tagged according to the ISO-693 standard.

The name pronunciation updater 110 may further call a name audio generator 120 to determine an audio file 122 including a pronunciation for the name text in the computer rendered content 106 in the determined language 116 and according to the pronunciation attribute 118. The name audio generator 120 may determine an audio file 122 from user account information for the user associated with the name text providing an audio file of a pronunciation of the user name text in the language and pronunciation attribute. Alternatively, the name audio generator 120 may prompt the user associated with the name text using the client computer 102 to speak the name pronunciation into a microphone, in communication with the client computer 102, to generate an audio file of the received name pronunciation. The name pronunciation updater 110 upon receiving the language and pronunciation attribute from the name context detector 112 may generate a name pronunciation update request 300, including a user identifier of the user in the repository 114, the determined language 116, pronunciation attribute 118, and audio file 122, to add to the repository 114 for the user.

The name pronunciation server 100 may include a name pronunciation engine 124 to receive a name pronunciation request 200 and call a repository searcher 126 to search the repository 114 for a name pronunciation record having a name text, language, and pronunciation attribute matching those in the name pronunciation update request 300. The name pronunciation engine 124 may return an audio file for the record matching the search to the name request player 108 to play at the client 10 for the user to hear how the name is supposed to be pronounced in the given language and with the pronunciation attribute. The name pronunciation server 100 further includes a name pronunciation repository updater 128 to receive a name pronunciation update request 300 having a new audio file of a name pronunciation to add to the repository 114 for the user identified by the pronounced name text.

The network 104 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIG. 1 between the components and objects in the pronunciation server 100 and the client 102 represent a data flow between the components.

Generally, program modules, such as the program components 108, 110, 112, 120, 124, 126, 128 may comprise routines, programs, objects, components, logic, data structures, and so on that perform particular tasks or implement particular abstract data types. The program components and hardware devices of the computing devices 100 and 102 of FIG. 1 may be implemented in one or more computer systems, where if they are implemented in multiple computer systems, then the computer systems may communicate over a network.

The program components 108, 110, 112, 120, 124, 126, 128 may be accessed by a processor from memory to execute. Alternatively, some or all of the program components 108, 110, 112, 120, 124, 126, 128 may be implemented in separate hardware devices, such as Application Specific Integrated Circuit (ASIC) hardware devices.

The functions described as performed by the program 108, 110, 112, 120, 124, 126, 128 may be implemented as program code in fewer program modules than shown or implemented as program code throughout a greater number of program modules than shown.

The program components described as implemented in the pronunciation server 100 may be implemented at the client system 102.

The client computer 102 may comprise a personal computing device, such as a laptop, desktop computer, tablet, smartphone, etc. The server 100 may comprise one or more server class computing devices, or other suitable computing devices. The systems 100 and 102 may comprise physical machines or virtual machines.

Figure 2:
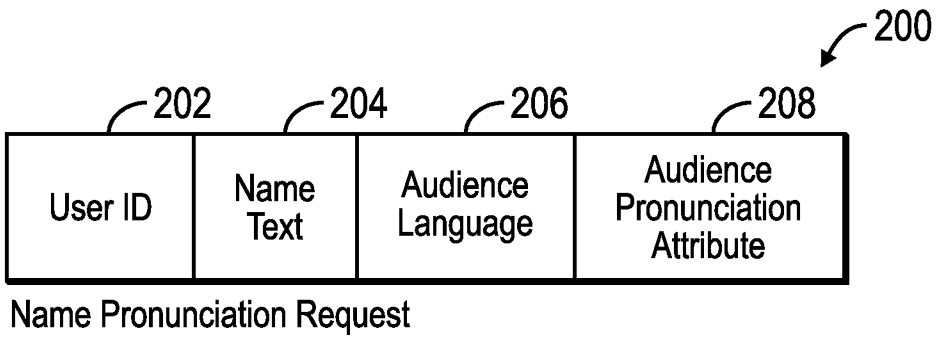
FIG. 2 illustrates an embodiment of a name pronunciation request for a pronunciation of name text appearing in computer rendered content.

FIG. 2 illustrates an embodiment of a name pronunciation request 200 generated by the name request player 108 to request an audio file providing pronunciation of a name text in computer rendered content 106, and includes: a user ID 202 of the user in the repository 114 whose name text is to be pronounced; name text 204 in the computer rendered content 106 to pronounce; an audience language 206 of the name text 204; and an audience pronunciation attribute 208 of how to pronounce the name text 204 in the language 206.

Figure 3:
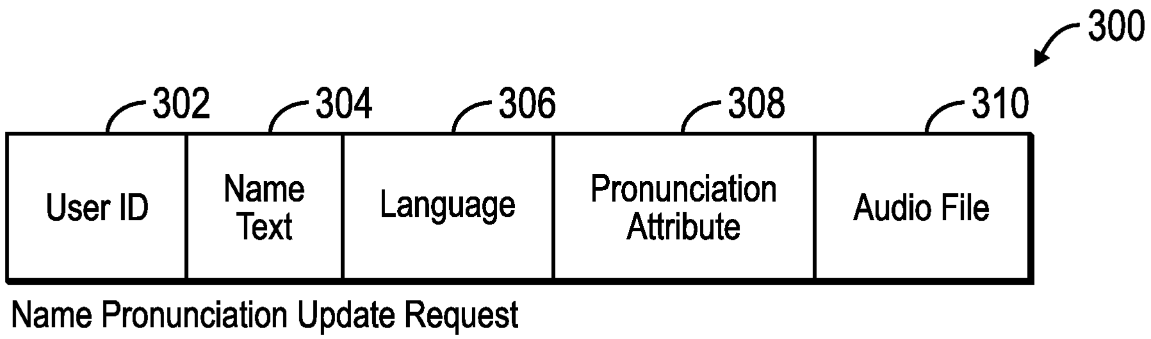
FIG. 3 illustrates an embodiment of a name pronunciation update request to update name pronunciation information for a user in a name pronunciation repository.

FIG. 3 illustrates an embodiment of a name pronunciation update request 300 generated by the name pronunciation updater 110 to add an audio file 122 to the repository 114 for a user associated with the name text, and includes: a user identifier 302 identifying a user in the repository 114; name text 304 of a name of the user 302 to pronounce; a language 306 of the name text 304; a pronunciation attribute 308 of how to pronounce the name text 304 in the language 306; and the audio file 310 comprising the audio file 122 generated by the name audio generator 120 having the pronunciation of the name text 304.

Figure 4:
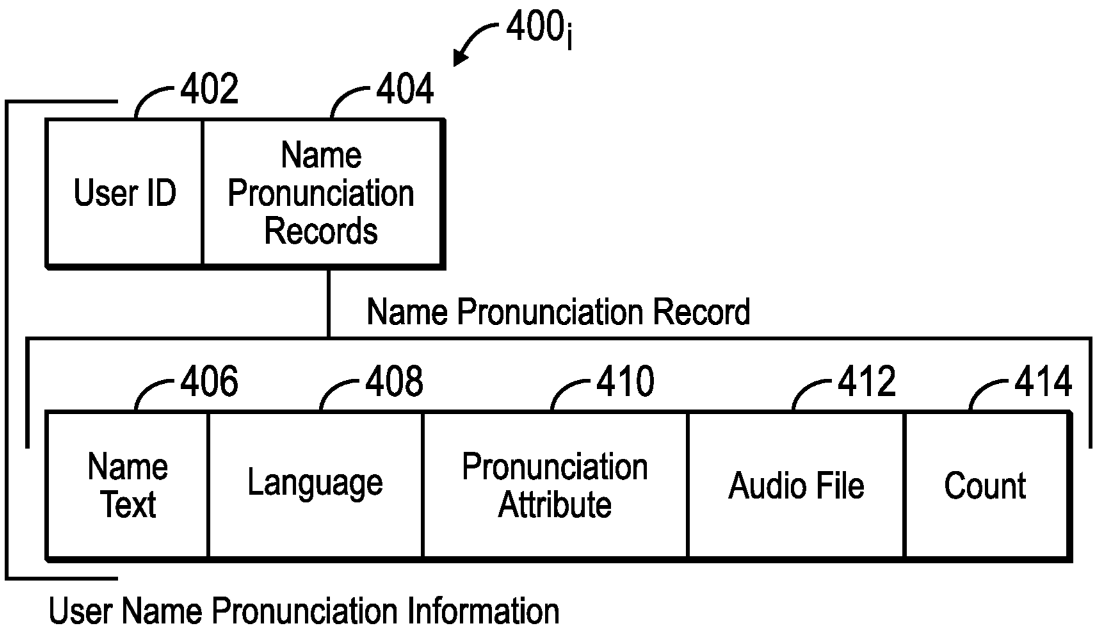
FIG. 4 illustrates an embodiment of user name pronunciation information in a repository for a user providing one or more audio files to pronounce name text for the user.

FIG. 4 illustrates an instance of user name pronunciation information $400_i$ in the repository 114 that provides different audio files providing pronunciations of name text for a user in different languages and/or pronunciation attributes. The user name pronunciation information $400_i$ includes a user identifier 402 of a user and one or more name pronunciation records 404 for the user. Each name pronunciation record 404 includes a name text 406 of a name for the user 402 to pronounce; a language 408; a pronunciation attribute 410 in which the name text 406 is pronounced in the language 408; an audio file 412 providing an audio pronunciation of the name text 406 in the language 408 and pronunciation attribute 410; and a count 414 indicate a number of times the name text is detected in computer rendered content 106 in the language 408 and pronunciation attribute 410 of the record 404.

The pronunciation attribute may comprise an accent or dialect in which the name text is pronounced. The pronunciation attribute may comprise other attributes of pronunciation.

FIG. 4 shows one implementation of the user name pronunciation information. In alternative embodiments, the organization, data structures and fields used to represent the information in the user name pronunciation information $400_i$ may be represented in different data arrangements, such as in different database records and objects that provide the association of data shown in FIG. 4.

Figure 5:
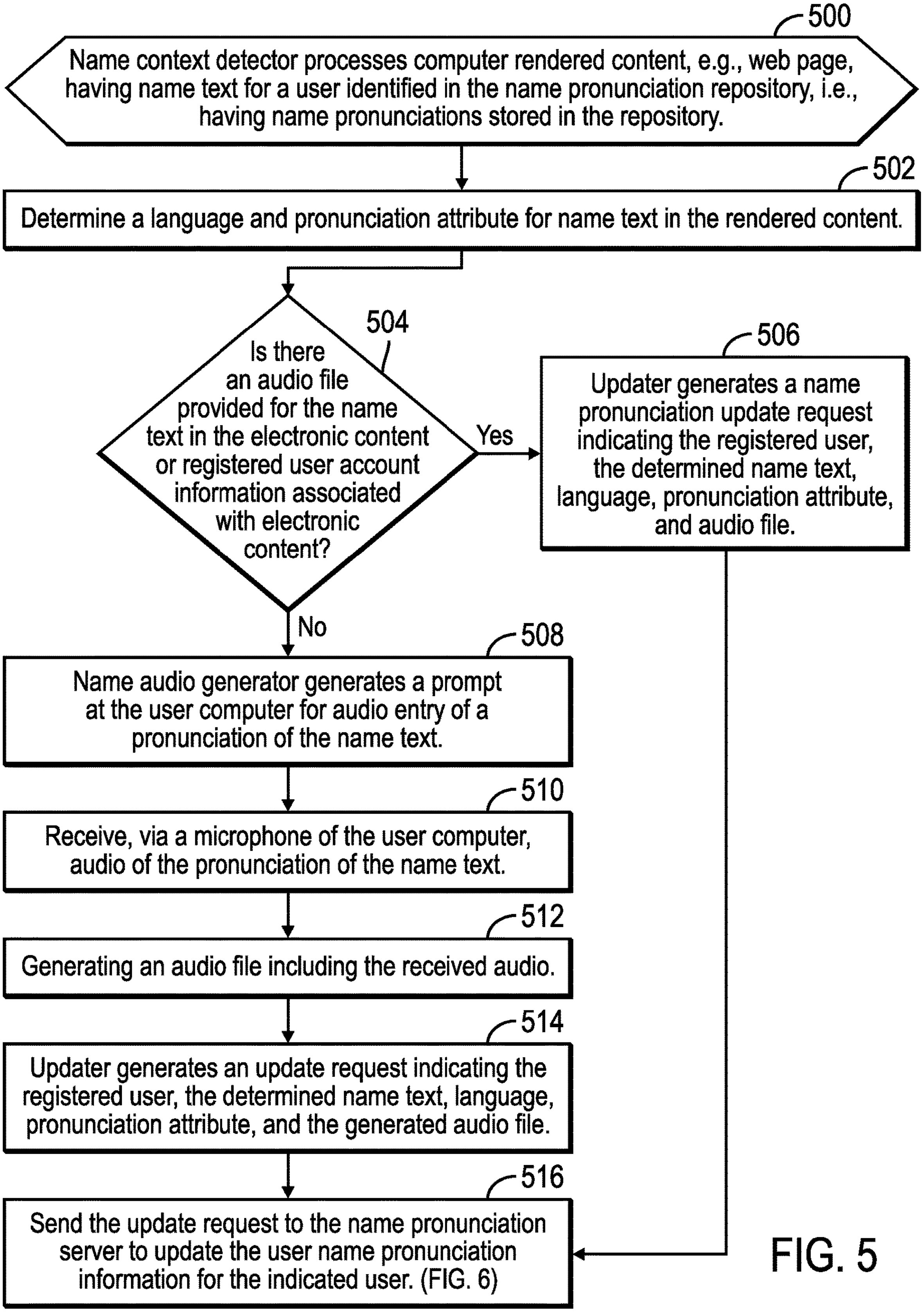
FIG. 5 illustrates an embodiment of operations to generate a name pronunciation update request to access an audio file from a repository providing a pronunciation of name text in computer rendered content.

FIG. 5 illustrates an embodiment of operations performed by the name pronunciation updater 110, name context detector 112, and name audio generator 120 to produce a name pronunciation update request 30 to update user name pronunciation information $400_i$ in the repository 114. Upon the name context detector 112 processing (at block 500) computer rendered content 106 having name text for a user included in the repository 114, the name context detector 112 determines (at block 502) a language 116 and pronunciation attribute 118 for name text in the computer rendered content 106. The name context detector 112 may implement natural language processing (NLP) to process the rendered content 106 and other information to determine a pronunciation attribute 118, such as text or metadata indicating an accent or dialectic associated with the user. Alternatively, the pronunciation attribute 118 may be determined from user account information for the user whose name is to be pronounced. Yet further, Internet of Thing (IoT) sensors may be used to gather the language and pronunciation attributes of the name text.

The name audio generator 120 determines (at block 504) whether there is an audio file 122 provided for the name text in the computer rendered content 106 or registered user account information associated with computer rendered content 106. If an audio file 122 is provided, then the name pronunciation updater 110 generates (at block 506) a name pronunciation update request 300 indicating the user 302, the determined name text 304 of the user in the computer rendered content 106, a language 306 comprising the determined language 116, pronunciation attribute 308 comprising the determined pronunciation attribute 118, and audio file 310 comprising the determined audio file 122. If (at block 504) there is no provided audio file 122, then the name audio generator 120 generates (at block 508) a prompt in a graphical user interface (GUI) at the client computer 102 for audio of a pronunciation of the name text. Upon receiving (at block 510), via a microphone of the computer 102, audio of pronunciation of the name text, an audio file 122 is generated (at block 512) including the received audio. The name pronunciation updater 110 generates (at block 514) a name pronunciation update request 300 indicating the user 302 identified by the name text 304 to pronounce, the language 306, comprising the determined language 116, the pronunciation attribute 308 comprising the determined attribute 118, and the audio file 310 comprising the generated audio file 122. From block 506 or 514, the generated update request 300 is sent (at block 516) to the name pronunciation sever 100 to update the user name pronunciation information $400_i$ for the indicated registered user 302 according to the operations in FIG. 6.

With the operations of FIG. 5, the client 102 processes computer rendered content 106 to determine whether there is name text for a name of a user in the repository 114 and a pronunciation audio file 122 to pronounce that determined name text in the context of the language and pronunciation attribute for the name text. This allows for the continued gathering of name pronunciations for name text in different language and pronunciation attribute contexts to store for the user in the repository 114 for later recall when an observer of the name text seeks to play audio of a pronunciation of the name text to understand the correct pronunciation of the name text in the context presented.

Figure 6:
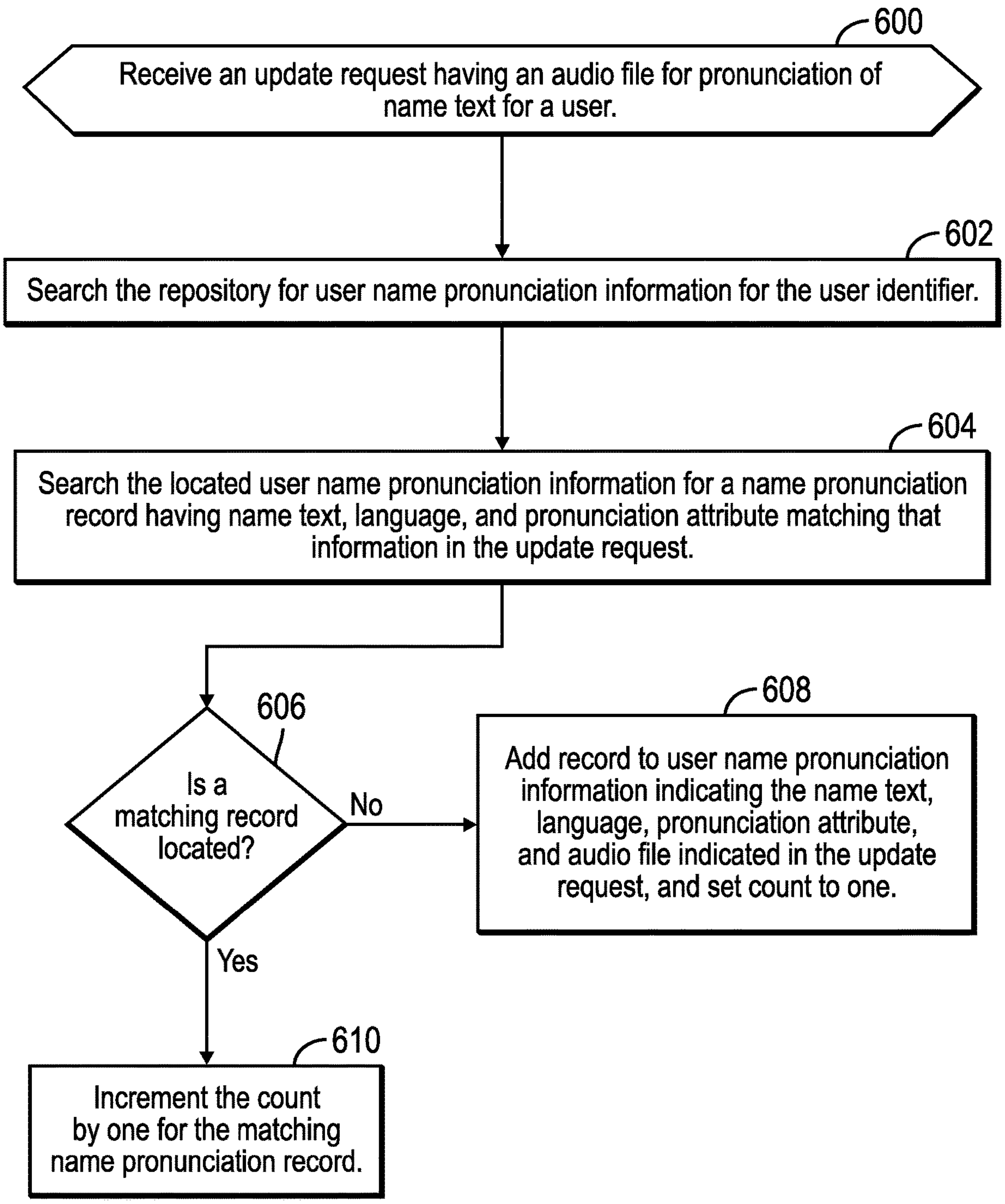
FIG. 6 illustrates an embodiment of operations to add an audio file, providing a name pronunciation for a user included in a received name pronunciation update request, to the repository.

FIG. 6 illustrates an embodiment of operations performed by the name pronunciation repository updater 128. Upon receiving (at block 600) a name pronunciation update request 300 from a client computer 102, the updater 128 searches (at block 602) the repository for user name pronunciation information $400_i$ for the user identifier 302 in the update request 300. The located user name pronunciation information $400_i$ is searched (at block 604) for a name pronunciation record 404 having name text 406, language 408, and pronunciation attribute 410 matching fields 304, 306, and 308, respectively, in the update request 300. If (at block 606) a matching record 404 is not located, then the updater 128 adds (at block 608) a record 404 to the user name pronunciation information $400_i$ for the user 302 indicating the name text 304, language 306, pronunciation attribute 308, and audio 310 in the update request 300 in respective fields 406, 408, 410, and 412 of the added name pronunciation record 404, and sets the count 414 for the added record 404 to one. If (at block 606) a matching record 404 is located, then the count 414 of the located record 404 is incremented (at block 610) to indicate a frequency at which the name text in the particular context is located in computer rendered content.

With the embodiment of FIG. 6, if an update request provides a new name pronunciation for a different name text, language, and/or pronunciation attribute for a user in the repository 114, then a new name pronunciation record 404 is added to the user name pronunciation information $400_i$ for that user providing a new pronunciation for a name text of the user. Further, if a record 404 already exists in the user name pronunciation information $400_i$ for the name text/language/pronunciation attribute tuple for the user, then the count 414 for that already existing record 404 is incremented to indicate the frequency that name text/language/pronunciation attribute appears in computer rendered content. This allows a ranking of the name pronunciation records 404 by their frequency of use in computer rendered content to allow determination of the most frequent pronunciation of name text for a user. Further, the repository can maintain the correct pronunciations for all names of a user in different language and/or pronunciation attribute (e.g., dialect or accent) contexts in which the name text is presented.

Figure 7:
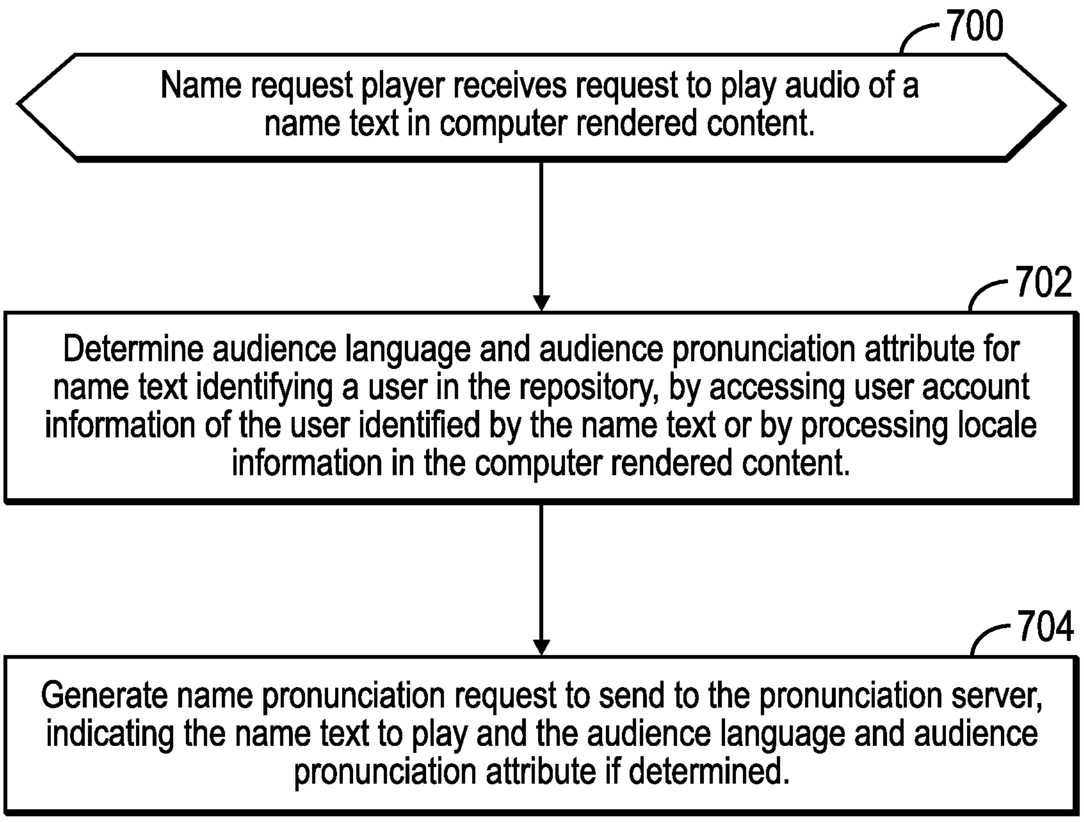
FIG. 7 illustrates an embodiment of operations to generate a name pronunciation request to request audio to pronounce name text in computer rendered content.

FIG. 7 illustrates an embodiment of operations performed by the name request player 108 upon receiving an observer of the content 106 request to play a pronunciation of name text in computer rendered content 106. Upon receiving (at block 700) a request to play audio for name text in computer rendered content 106 identifying a user in the repository 114, the name request player 108 determines (at block 702) audience language and an audience pronunciation attribute for the name text by accessing user account information of the user identified by the name text or by processing locale information in the computer rendered content 106. A name pronunciation request 200 is generated (at block 704), to send to the pronunciation server 100, indicating the user 202 identified by the name text 204 and the determined audience language 206 and audience pronunciation attribute 208.

With the embodiment of FIG. 7, when an observer of the computer rendered content 106, such as the audience for the computer rendered content 106, selects name text in the computer rendered content 106 to pronounce, the name request player 108 generates a name pronunciation request 200 to send to the pronunciation server 100 to obtain the correct pronunciation from the repository 114 based on the language of the name text and a pronunciation attribute indicating how that particular instance of the name text in the context of the computer rendered content 106 is to be pronounced, such as dialect or accent.

Figure 8:
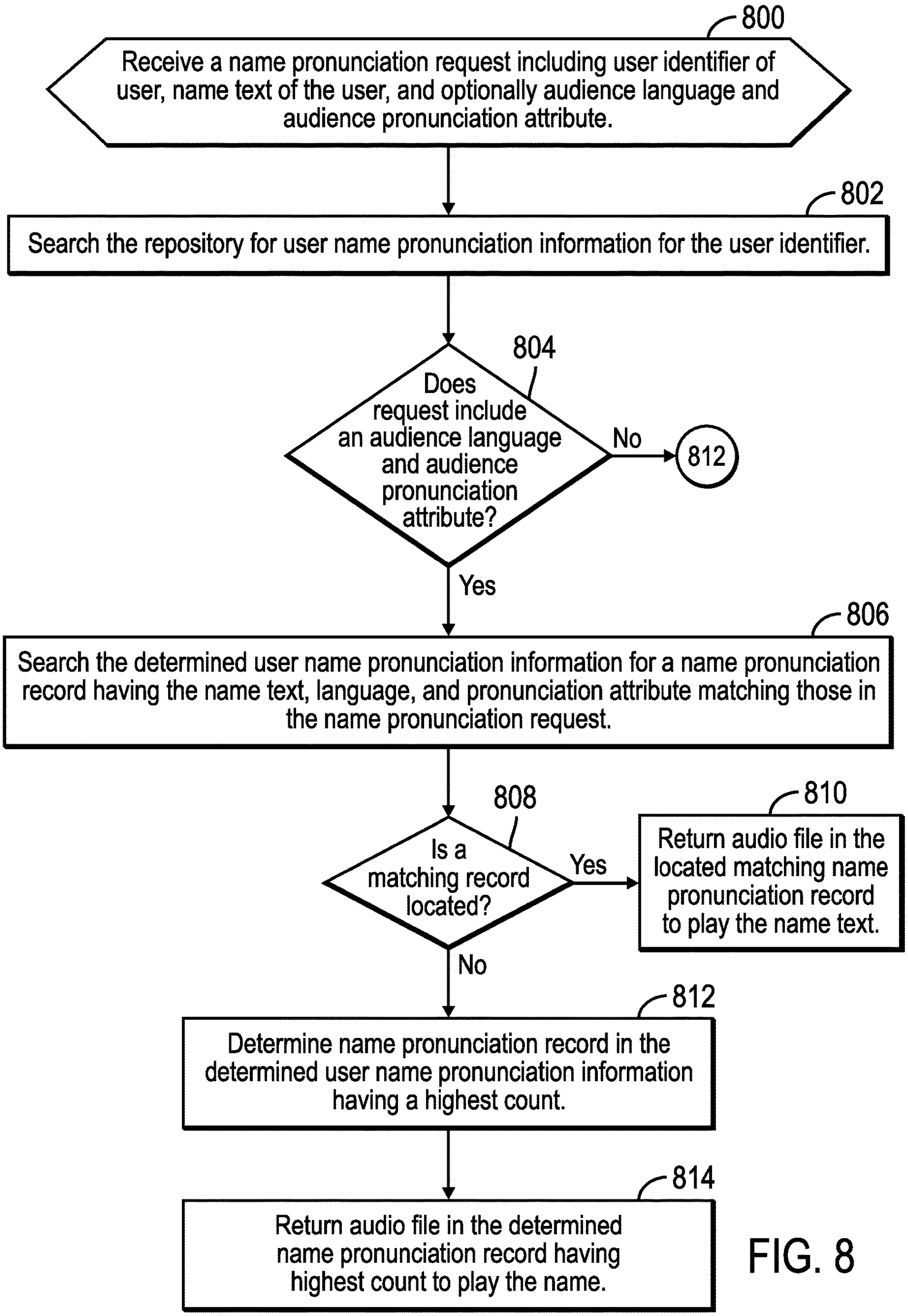
FIG. 8 illustrates an embodiment of operations to process a name pronunciation request to return an audio file having a pronunciation of name text in computer rendered content.

FIG. 8 illustrates an embodiment of operations performed by the name pronunciation engine 124 and the repository searcher 126 to locate an audio file to return to a name pronunciation request 200 to play the correct audio pronunciation of requested name text in computer rendered content 106. Upon receiving (at block 800) a name pronunciation request 300 including user identifier 302 of a user identified by the name text, the name text 304 of the user, and optionally audience language 306 and audience pronunciation attribute 308 for the context of the pronunciation, the pronunciation engine 124 calls the repository searcher 126 to search (at block 802) the repository 114 for user name pronunciation information $\mathbf{400}_i$ for the user identifier 302 in field 402. If (at block 804) the name pronunciation request 300 includes an audience language 306 and audience pronunciation attribute 308, the repository searcher 126 searches (at block 806) the determined user name pronunciation information $\mathbf{400}_i$ for a name pronunciation record 404 having the name text 406, language 408, and pronunciation attribute 410 matching those in the fields 304, 306, and 308 of the name pronunciation request 300.

If (at block 808) a matching record 404 is found, then the audio file 412 in the located matching name pronunciation record 404 is returned to the name request player 108 to play the pronunciation in the audio file to the observer of the computer rendered content 106 so they will know the correct pronunciation of the name text in the given context of the rendered content 106. If (at block 808) a matching record 404 is not located in the user name pronunciation information $\mathbf{400}_i$ for the registered user 402 or if (at block 804) the name pronunciation request 300 does not include information for an audience language 206 and audience pronunciation attribute 208, then a name pronunciation record 404 in the user name pronunciation information $\mathbf{400}_i$ is determined (at block 812) having a highest count 414, i.e., the most frequently located pronunciation. The audio file 412 for the determined record 404 having the highest count 414 is returned (at block 814) to the name request player 108 to render at the client computer 102 for the observer.

With the embodiment of operations of FIG. 8, the audio file having the pronunciation for name text is returned that is appropriate for the language and pronunciation attribute of the context in which the name text is rendered. If the repository 114 does not have an audio file for the requested language and pronunciation attribute context or if no language or pronunciation attribute is provided, then the audio file 412 in the name pronunciation record 404 that is most frequently located for the user is returned to the name request player because that is the name pronunciation most likely to be intended and correct for the name text in the computer rendered content 106.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing g. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, including updating and searching a name pronunciation repository providing audio files of name pronunciations for name text in a particular language and according to a pronunciation attribute.

In addition to block 901, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 901, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

Figure 9:
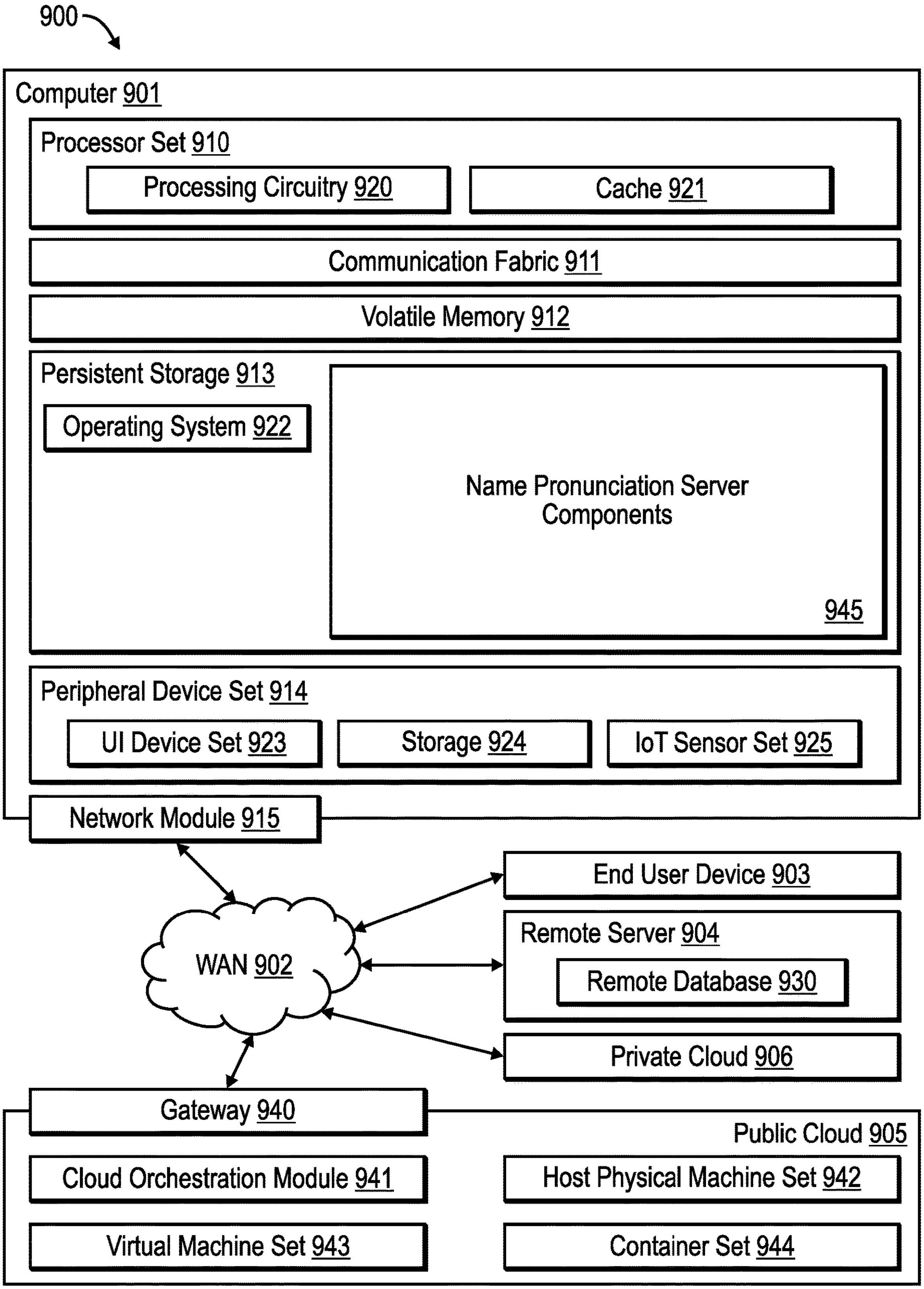
FIG. 9 illustrates a computing environment in which the components of FIG. 1 may be implemented.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. For instance, the computer 901 may comprise the name pronunciation server 100 and the database 930 may comprise the repository. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid-state storage devices. Operating system 922 may take several forms, such as various known proprietary operating systems or open-source Portable Operating System Interface-type operating systems that employ a kernel. The name pronunciation server components 945 typically includes at least some of the computer code involved in performing the inventive methods, including program components 124, 126, and 128 (FIG. 1) in the name pronunciation server 100.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and may take any of the forms discussed above in connection with computer 901. EUD 903, which may include the components of client 102 in FIG. 1, including components 108, 110, 112, 120, typically receives helpful and useful data from the operations of computer 901, which may comprise the name pronunciation server 100. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904. The remote database 930 may implement the name pronunciation repository 114. Further, the remote server 904 may implement the name pronunciation server 100 and components therein.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing audio pronunciations of name text presented in computer rendered content, the computer program product comprising a computer readable storage medium having computer readable program code embodied therein that is executable to perform operations, the operations comprising:

providing user name pronunciation information in a repository for users, wherein the user name pronunciation information for a user of the users, whose name is to be pronounced, indicates an identifier of the user, a language, a pronunciation attribute to pronounce name text of the user, and an audio file providing an audio pronunciation of the name text of the user in the language according to the pronunciation attribute;

receiving a name pronunciation request indicating a user identifier of a requested user of the users, an audience language, and an audience pronunciation attribute in which name text of the requested user is to be pronounced;

determining, from the repository, an audio file associated with a language and a pronunciation attribute for the requested user matching the audience language and the audience pronunciation attribute, respectively, in the name pronunciation request; and returning the determined audio file to output audio in the audio file pronouncing the name text of the requested user.

2. The computer program product of claim 1, wherein the name pronunciation request includes the name text of the requested user in computer rendered content to pronounce, and wherein the determined audio file is further associated with the name text in the name pronunciation request.

3. The computer program product of claim 1, wherein the repository provides a plurality of audio files providing pronunciations of the name text of the user in different languages and/or pronunciation attributes for the users in the repository, wherein the plurality of audio files includes the determined audio file.

4. The computer program product of claim 1, wherein the pronunciation attribute indicates at least one of a dialect of the language and an accent in which the name text of the user is pronounced in the language.

5. The computer program product of claim 1, wherein the operations further comprise:

receiving an update request for a specified user of the users in the repository indicating a language and a pronunciation attribute detected for name text for the specified user in computer rendered content and an audio file having a pronunciation of the name text for the specified user; and adding, to the repository, information for the specified user indicating the language, the pronunciation attribute, and the audio file in the update request.

6. The computer program product of claim 1, wherein the operations further comprise:

receiving an update request for a specified user of the users in the repository indicating a language and a pronunciation attribute detected for name text of the specified user in computer rendered content and an audio file having a pronunciation of the name text for the specified user;

determining information in the repository for the specified user indicating the language and the pronunciation attribute in the update request; and incrementing a count in the determined information, wherein counts for audio files for different languages and/or pronunciation attributes are used to select the audio file to pronounce the name text for the specified user.

7. The computer program product of claim 1, wherein the operations further comprise:

deploying, at a client computer, a name context detector, a name audio generator, and a name pronunciation updater, wherein the name context detector executes at the client computer to process computer rendered content to determine the language and the pronunciation attribute for a name of the user in the repository, wherein the name audio generator processes the computer rendered content to determine the audio file providing a pronunciation of the name text of the user in the repository, wherein the name pronunciation updater generates an update request including the language and the pronunciation attribute determined by the name context detector and the audio file determined by the name audio generator to add to the repository for the user in the repository.

8. The computer program product of claim 7, wherein the name audio generator performs:

determining whether user account information for the user in the repository indicates the audio file providing the pronunciation of the name text of the user identified in the repository according to the language and the pronunciation attribute determined by the name context detector, wherein the audio file included in the update request includes the audio file determined from the user account information.

9. The computer program product of claim 7, wherein the name audio generator performs:

generating a prompt at the client computer for the pronunciation of the name text of the user in the repository;

receiving audio of the pronunciation of the name text of the user in the repository; and generating the audio file including the received audio to include in the update request.

10. A system for providing audio pronunciations of name text presented in computer rendered content, comprising:

a processor; and a computer readable storage medium having computer readable program code embodied therein that is executable by the processor to perform operations, the operations comprising:

providing user name pronunciation information in a repository for users, wherein the user name pronunciation information for a user of the users, whose name is to be pronounced, indicates an identifier of the user, a language, a pronunciation attribute to pronounce name text of the user, and an audio file providing an audio pronunciation of the name text of the user in the language according to the pronunciation attribute;

receiving a name pronunciation request indicating a user identifier of a requested user of the users, an audience language and an audience pronunciation attribute in which name text of the requested user is to be pronounced;

determining, from the repository, an audio file associated with a language and a pronunciation attribute for the requested user matching the audience language and the audience pronunciation attribute, respectively; and returning the determined audio file to output audio in the audio file pronouncing the name text of the requested user.

11. The system of claim 10, wherein the name pronunciation request includes the name text of the requested user in computer rendered content to pronounce, and wherein the determined audio file is further associated with the name text in the name pronunciation request.

12. The system of claim 10, wherein the operations further comprise:

receiving an update request for a specified user of the users in the repository indicating a language and a pronunciation attribute detected for name text for the specified user in computer rendered content and an audio file having a pronunciation of the name text for the specified user; and adding, to the repository, information for the specified user indicating the language, the pronunciation attribute, and the audio file in the update request.

13. The system of claim 10, wherein the operations further comprise:

receiving an update request for a specified user of the users in the repository indicating a language and a pronunciation attribute detected for name text of the specified user in computer rendered content and an audio file having a pronunciation of the name text for the specified user;

determining information in the repository for the specified user indicating the language and the pronunciation attribute in the update request; and incrementing a count in the determined information, wherein counts for audio files for different languages and/or pronunciation attributes are used to select the audio file to pronounce the name text for the specified user.

14. The system of claim 10, wherein the operations further comprise:

deploying, at a client computer, a name context detector, a name audio generator, and a name pronunciation updater, wherein the name context detector executes at the client computer to process computer rendered content to determine the language and the pronunciation attribute for a name of the user in the repository, wherein the name audio generator processes the computer rendered content to determine the audio file providing a pronunciation of the name text of the user in the repository, wherein the name pronunciation updater generates an update request including the language and the pronunciation attribute determined by the name context detector and the audio file determined by the name audio generator to add to the repository for the user in the repository.

15. The system of claim 14, wherein the name audio generator performs:

generating a prompt at the client computer for the pronunciation of the name text of the user in the repository;

receiving audio of the pronunciation of the name text of the user in the repository; and generating the audio file including the received audio to include in the update request.

16. A method for providing audio pronunciations of name text presented in computer rendered content, the method comprising:

providing user name pronunciation information in a repository for users, wherein the user name pronunciation information for a user of the users, whose name is to be pronounced, indicates an identifier of the user, a language, a pronunciation attribute to pronounce name text of the user, and an audio file providing an audio pronunciation of the name text of the user in the language according to the pronunciation attribute;

receiving a name pronunciation request indicating a user identifier of a requested user of the users, an audience language and an audience pronunciation attribute in which name text of the requested user is to be pronounced;

determining, from the repository, an audio file associated with a language and a pronunciation attribute for the requested user matching the audience language and the audience pronunciation attribute, respectively; and returning the determined audio file to output audio in the audio file pronouncing the name text of the requested user.

17. The method of claim 16, wherein the name pronunciation request includes the name text of the requested user in computer rendered content to pronounce, and wherein the determined audio file is further associated with the name text in the name pronunciation request.

18. The method of claim 16, further comprising:

receiving an update request for a specified user of the users in the repository indicating a language and a pronunciation attribute detected for name text for the specified user in computer rendered content and an audio file having a pronunciation of the name text for the specified user; and adding, to the repository, information for the specified user indicating the language, the pronunciation attribute, and the audio file in the update request.

19. The method of claim 16, further comprising:

receiving an update request for a specified user of the users in the repository indicating a language and a pronunciation attribute detected for name text of the specified user in computer rendered content and an audio file having a pronunciation of the name text for the specified user;

determining information in the repository for the specified user indicating the language and the pronunciation attribute in the update request; and incrementing a count in the determined information, wherein counts for audio files for different languages and/or pronunciation attributes are used to select the audio file to pronounce the name text for the specified user.

20. The method of claim 16, further comprising:

deploying, at a client computer, a name context detector, a name audio generator, and a name pronunciation updater, wherein the name context detector executes at the client computer to process computer rendered content to determine the language and the pronunciation attribute for a name of the user in the repository, wherein the name audio generator processes the computer rendered content to determine the audio file providing a pronunciation of the name text of the user in the repository, wherein the name pronunciation updater generates an update request including the language and the pronunciation attribute determined by the name context detector and the audio file determined by the name audio generator to add to the repository for the user in the repository.

* * * * *